(12) United States Patent
Mohamed et al.

(10) Patent No.: US 11,392,469 B2
(45) Date of Patent: Jul. 19, 2022

(54) FRAMEWORK FOR TESTING MACHINE LEARNING WORKFLOWS

(71) Applicant: Microsoft Technology Licensing, LLC, Redmond, WA (US)

(72) Inventors: Ali Sadiq Mohamed, San Jose, CA (US); Manish Swaminathan, Sunnyvale, CA (US); Shunlin Liang, San Jose, CA (US); Prateek Sachdev, Sunnyvale, CA (US); Vivek Desai, Sunnyvale, CA (US); Adam R. Peck, Redwood City, CA (US); Sunny Sanjiv Ketkar, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 462 days.

(21) Appl. No.: 16/447,739

(22) Filed: Jun. 20, 2019

(65) Prior Publication Data

US 2020/0401491 A1    Dec. 24, 2020

(51) Int. Cl.
    *G06F 11/00*     (2006.01)
    *G06F 11/22*     (2006.01)
    *G06N 20/00*     (2019.01)

(52) U.S. Cl.
    CPC ......... *G06F 11/2273* (2013.01); *G06N 20/00* (2019.01)

(58) Field of Classification Search
    CPC .... G06F 11/2273; G06N 20/00; G06N 5/003; G06N 7/005; G06N 3/08
    USPC ...................................................... 714/1–57
    See application file for complete search history.

(56) References Cited

U.S. PATENT DOCUMENTS

| | | | | |
|---|---|---|---|---|
| 6,671,811 B1* | 12/2003 | Diep | ............... | G06F 21/552 714/33 |
| 10,990,516 B1* | 4/2021 | Merritt | ............... | G06F 11/3688 |
| 2007/0033441 A1* | 2/2007 | Sathe | ............... | G06F 11/36 714/38.14 |
| 2009/0055686 A1* | 2/2009 | Tsang | ............... | G06F 11/3664 714/33 |
| 2009/0307763 A1* | 12/2009 | Rawlins | ............... | G06F 11/3672 726/5 |
| 2011/0231708 A1* | 9/2011 | Lawrance | ............... | G06F 11/3664 714/38.1 |
| 2015/0006972 A1* | 1/2015 | Jones | ............... | G06F 11/076 714/47.2 |
| 2015/0082090 A1* | 3/2015 | Holden | ............... | G06F 11/263 714/25 |

(Continued)

*Primary Examiner* — Sarai E Butler
(74) *Attorney, Agent, or Firm* — Schwegman Lundberg & Woessner, P.A.

(57) ABSTRACT

The disclosed embodiments provide a system for testing machine learning workflows. During operation, the system obtains a configuration for a staging test of a machine learning model, wherein the configuration includes a model name for the machine learning model, a duration of the staging test, and a use case associated with the machine learning model. Next, the system selects a staging test host for the staging test. The system then deploys the staging test on the staging test host in a staging environment, wherein the deployed staging test executes the machine learning model based on live traffic received from a production environment. After the staging test has completed, the system outputs a set of metrics representing a system impact of the machine learning model on the staging test host.

18 Claims, 4 Drawing Sheets

(56) References Cited

U.S. PATENT DOCUMENTS

| | | | |
|---|---|---|---|
| 2016/0162803 A1* | 6/2016 | Amershi | G06F 11/162 |
| | | | 714/57 |
| 2017/0017902 A1* | 1/2017 | Razin | H04L 41/16 |
| 2017/0300814 A1* | 10/2017 | Shaked | G06N 3/0454 |
| 2019/0347689 A1* | 11/2019 | Bullock | G06N 20/00 |
| 2019/0384699 A1* | 12/2019 | Arbon | G06N 20/00 |
| 2020/0007934 A1* | 1/2020 | Ortiz | H04N 21/478 |
| 2020/0134493 A1* | 4/2020 | Bhide | G06F 9/547 |

* cited by examiner

FRAMEWORK FOR TESTING MACHINE LEARNING WORKFLOWS

BACKGROUND

Field

The disclosed embodiments relate to machine learning workflows. More specifically, the disclosed embodiments relate to a framework for testing machine learning workflows.

Related Art

Machine learning and/or analytics allow trends, patterns, relationships, and/or other attributes related to large sets of complex, interconnected, and/or multidimensional data to be discovered. In turn, the discovered information can be used to gain insights and/or guide decisions and/or actions related to the data. For example, machine learning involves training regression models, artificial neural networks, decision trees, support vector machines, deep learning models, and/or other types of machine learning models using labeled training data. Output from the trained machine learning models is then used to assess risk, detect fraud, generate recommendations, perform root cause analysis of anomalies, and/or provide other types of enhancements or improvements to applications, electronic devices, and/or user experiences.

However, significant increases in the size of data sets have resulted in difficulties associated with collecting, storing, managing, transferring, sharing, analyzing, and/or visualizing the data in a timely manner. For example, conventional software tools and/or storage mechanisms are unable to handle petabytes or exabytes of loosely structured data that is generated on a daily and/or continuous basis from multiple, heterogeneous sources. Instead, management and processing of "big data" commonly require massively parallel and/or distributed software running on a large number of physical servers.

Training and/or execution of machine-learning models with large numbers of features, large datasets, and/or complex architectures additionally require more memory, computational resources, and time than those of machine-learning models with smaller numbers of features, smaller datasets, and/or simpler architectures. Moreover, conventional techniques fail to provide mechanisms for measuring the impact of machine learning models and/or feature sets on systems on which the machine learning models are deployed.

For example, a machine learning model that is trained, tested, and validated is selected for deployment into a production environment. After the machine learning model is deployed, live traffic is gradually ramped to the machine learning model, and the machine learning model's impact on user-level metrics (e.g., click-through rates, positive outcomes, etc.) and/or service-level metrics (e.g., latencies, error rates, etc.) is monitored. As a result, the model's system impact is not measured until the model is running in a real-world production setting. In addition, the model's actual latency and/or system impact cannot be detected until the model has been ramped up to handle a significant percentage of traffic, which can negatively impact system performance in the production environment and/or user experiences (e.g., due to excessive latency, downtime, bugs, and/or other issues). Similarly, new features or feature producers are not validated until models that consume the features are deployed into production, which can cause errors in the execution and/or output of the models and negatively impact downstream services and/or user experiences. In turn, any latency and/or system-related issues caused by the model and/or features require manual intervention and/or rollback to an earlier and/or baseline version of the model to prevent system performance and/or user experiences from being further impacted.

Consequently, machine learning and/or analytics may be facilitated by mechanisms for improving the creation, testing, validation, management, sharing, and reuse of features and/or machine learning models.

BRIEF DESCRIPTION OF THE FIGURES

In the figures, like reference numerals refer to the same figure elements.

DETAILED DESCRIPTION

Figure 1:
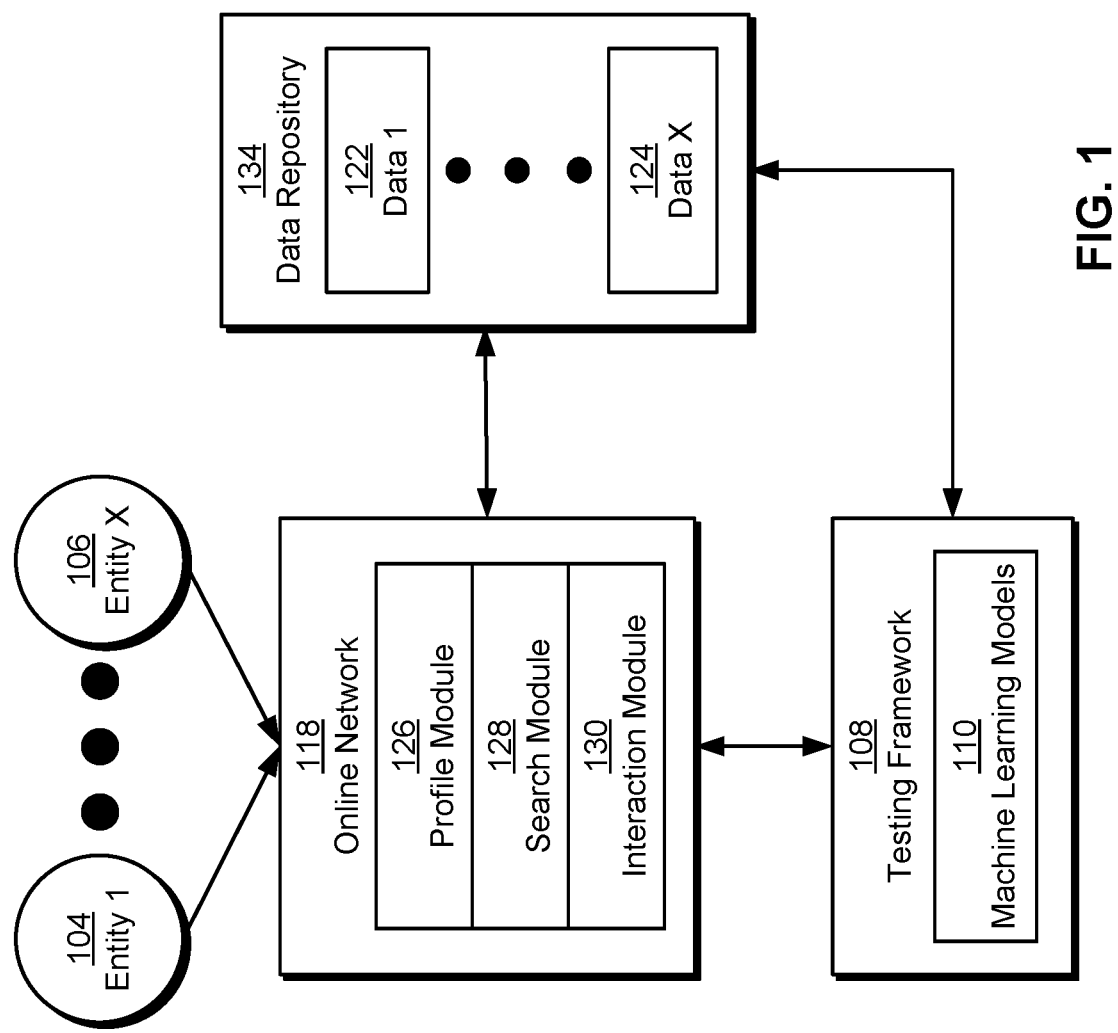
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for testing machine learning workflows. Each machine learning workflow includes a machine learning model that performs prediction, inference, classification, regression, recommendation, clustering, and/or other types of data analysis. The machine learning workflow also includes commands, calls, routines, and/or other mechanisms for generating and/or retrieving features that are inputted into the machine learning model.

For example, a machine learning workflow includes features related to users, user activity, and/or content in an online system. The machine learning workflow also includes a machine learning model that generates, based on the features, scores representing likelihoods of positive responses between the users and content. The content is ranked by descending score from the machine learning model, and the ranked content is outputted in content feeds for the corresponding users in the online system.

More specifically, the disclosed embodiments provide a framework for performing staging tests of machine learning workflows. Each staging test involves deploying a machine learning workflow onto a staging test host in a staging environment and directing live traffic from a production environment to the staging test host. Each staging test is also defined and/or created using a corresponding configuration. For example, a configuration for a staging test of a machine learning model that scores and ranks content items for users includes a model name of the machine learning model, the duration of the staging test, a use case representing the access point for a content feed containing the ranked content items, a proportion of live traffic to direct to the machine learning model, and/or an A/B test that compares the performance of the machine learning model with another version of the machine learning model.

A staging service controller receives configurations for staging tests and adds the staging tests to a queue. The staging service controller also tracks states of a set of staging test hosts in the staging environment. When a staging test host has a state that indicates availability to run a staging test, the staging service controller deploys the staging test at the front of the queue on the staging test host. During the staging test, the machine learning workflow processes live traffic received from a corresponding dispatcher host in a production environment, and metrics such as latencies, queries per second (QPS), error rates, processor utilization, memory usage, garbage collection duration, heap utilization, and/or timeout counts are collected by or from the staging test host. The metrics are used to generate a report that includes lists, charts, tables, visualizations, percentiles, and/or other representations of the metrics. In turn, the report is used to assess the system impact of the machine learning workflow and/or verify that the machine learning workflow can run safely and/or correctly in a production environment.

By running staging tests that direct live traffic from a production environment to machine learning models or workflows in a staging environment, the disclosed embodiments allow creators and/or developers of the machine learning models to determine the correctness and/or system impact of the models or workflows without deploying the models or workflows in the production environment. As a result, the disclosed embodiments improve the performance and/or uptime of the production environment over conventional techniques that deploy new machine learning workflows into production environments and measure the performance or system impact of the new machine learning workflows in the production environments. The creators and/or developers are also able to quickly create configurations that define and/or create the staging tests and use the configurations to run the staging tests. In other words, the disclosed embodiments provide a "self-serve" testing framework that allows the creators and/or developers to measure system impact of machine learning workflows, which improves scalability and reduces computational overhead and processing time over conventional techniques that require manual deployment of workflows into staging and/or testing environments and/or hard coding of staging tests of the workflows. Consequently, the disclosed embodiments improve computer systems, applications, user experiences, tools, and/or technologies related to machine learning, monitoring system impact, and/or testing workflows.

Framework for Testing Machine Learning Workflows

FIG. 1 shows a schematic of a system in accordance with the disclosed embodiments. As shown in FIG. 1, the system includes an online network 118 and/or other user community. For example, online network 118 includes an online professional network that is used by a set of entities (e.g., entity 1 104, entity x 106) to interact with one another in a professional and/or business context.

The entities include users that use online network 118 to establish and maintain professional connections, list work and community experience, endorse and/or recommend one another, search and apply for jobs, and/or perform other actions. The entities also, or instead, include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 also allows the entities to view the profiles of other entities in online network 118.

Profile module 126 also, or instead, includes mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 is tracked and stored in a database, data warehouse, cloud storage, and/or other data-storage mechanism providing data repository 134.

Data in data repository 134 is then used to generate recommendations and/or other insights related to the entities and/or actions within online network 118. For example, one or more components of online network 118 track searches, clicks, views, text input, conversions, and/or other feedback during the entities' interaction with content feeds shown in the home page and/or other components of online network 118. The feedback is stored in data repository 134 and used as training data for one or more machine learning models 110, and the output of machine learning models 110 is used to select and rank jobs, advertisements, posts, articles, connections, products, companies, groups, and/or other types of content, entities, or actions for members of online network 118. The selected and/or ranked content items are then shown in content feeds of the members when the members access online network 118.

Continuing with the above example, a first set of machine learning models 110 is used to generate recommendations of specific types of content (e.g., network updates, jobs, articles, courses, advertisements, posts, products, connections, products, etc.) for a given member based on attributes of the member, recent activity by the member and/or similar members, and/or attributes of the content. The first set of machine learning models 110 output scores representing predictions of the member's level of interest in the content, and a subset of content items with high scores from the first set of machine learning models 110 is selected. Features associated with the member and the selected content items are inputted into one or more additional machine learning models 110, and the machine learning model(s) generate an additional set of scores between the member and the selected content items. The content items are ranked by descending score, and one or more rules, filters, and/or exceptions are used to update the ranking (e.g., based on business requirements, member preferences, impression discounting, diversification of content, and/or other goals, strategies, or priorities). Finally, the updated ranking is displayed in a content feed for the member.

Figure 2:
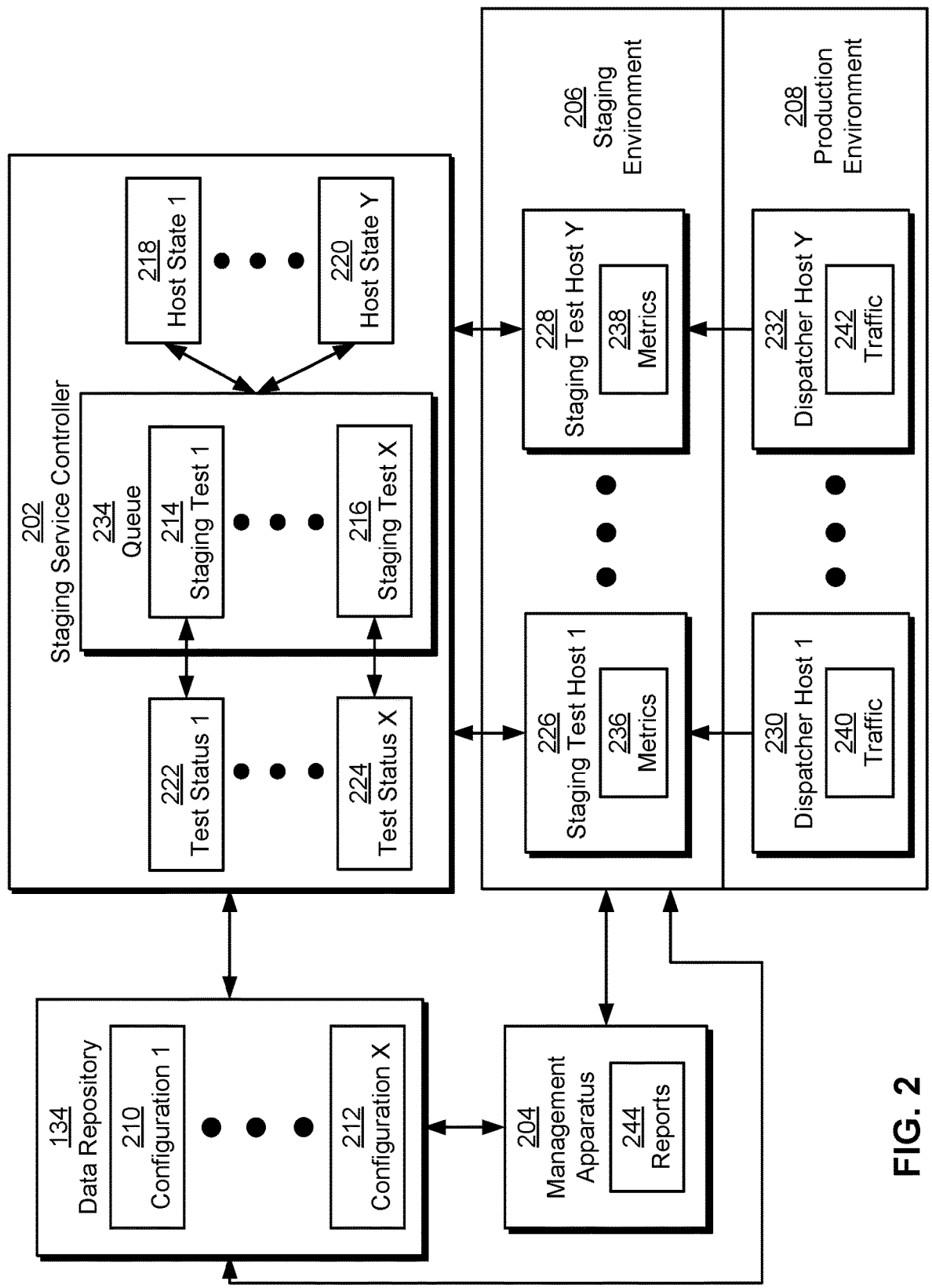
FIG. 2 shows a testing framework in accordance with the disclosed embodiments.

In one or more embodiments, a testing framework 108 provided by and/or executing in conjunction with online network 118 includes functionality to test the correctness, execution, and/or system impact of machine learning models 110 before machine learning models 110 are deployed into a production environment and used to influence interaction between members and various modules in online network 118. As shown in FIG. 2, a framework for testing machine learning models and/or workflows (e.g., testing framework 108 of FIG. 1) includes a staging service controller 202, a set of staging test hosts (e.g., staging test host 1 226, staging test host y 228) in a staging environment 206, a set of dispatcher hosts (e.g., dispatcher host 1 230, dispatcher host y 232) in a production environment 208, and a management apparatus 204. Each of these components is described in further detail below.

Staging service controller 202 manages the deployment and execution of staging tests (e.g., staging test 1 214, staging test x 216) on the staging test hosts. In some embodiments, each staging test involves executing a machine learning model (or workflow) on a staging test host in staging environment 206 and directing live traffic (e.g., traffic 240-242) from a corresponding dispatcher host in production environment 208 to the staging test host.

In some embodiments, staging environment 206 is used to test and/or validate the performance of machine learning models, workflows, and/or components using live traffic from production environment 208 without transmitting responses to the live traffic. As a result, the performance and/or correctness of the components can be tested using loads and/or conditions experienced in production environment 208 without impacting the execution of applications or services in production environment 208 and/or user experiences associated with the applications or services.

For example, each staging test involves one or more machine learning models that perform prediction, inference, classification, regression, clustering, and/or other analysis related to users of an online system (e.g., online network 118 of FIG. 1). An older, stable, and/or baseline machine learning model is deployed in one or more hosts in production environment 208. The production host(s) use the older, stable, and/or baseline version of the machine learning model to process features associated with the live traffic to generate output (e.g., recommendations, notifications, etc.) that is used to influence interaction between the online system and the users.

Continuing with the above example, the staging test includes a newer machine learning model that is deployed in a staging host with the same system configuration and/or resources (e.g., processor, memory, network bandwidth, operating system, etc.) as a corresponding host in production environment 208 (e.g., a host that executes the older, stable, and/or baseline version of the machine learning model). During the staging test, live traffic processed by the host in production environment 208 is sampled by a dispatcher host in production environment 208 and replicated to the staging host. The live traffic is processed by the newer machine learning model in the staging test host, but the staging test host does not provide the output of the newer machine learning model to production environment 208. Thus, the staging test allows the performance and/or correctness of the newer machine learning model to be assessed using real-world data and/or conditions without deploying the newer machine learning model in production environment 208 and/or affecting the parallel processing of the live traffic by the host in production environment 208.

As shown in FIG. 2, staging service controller 202 receives configurations (e.g., configuration 1 210, configuration x 212) for the staging tests from data repository 134 and/or another data source. For example, an administrator of a model or workflow creates a configuration as a file and uploads the file into data repository 134 to request execution of the corresponding staging test. In another example, the administrator specifies parameters of the configuration in a query, command, and/or other communication that is passed to staging service controller 202 and/or data repository 134.

Each configuration includes parameters that are used to define and/or perform the corresponding staging test. For example, a configuration for a staging test of a machine learning model that scores and ranks content items for users includes an owner of the staging test, a model name of the machine learning model (or a name or path of a corresponding machine learning workflow), the duration of the staging test, a use case representing the access point for a content feed containing the ranked content items, a proportion of live traffic to direct to the machine learning model, and/or an A/B test that compares the performance of the machine learning model with another version of the machine learning model.

An example representation of a configuration for a staging test includes the following:

```
{
    "owner": "urn:jsmith"
    "durationInMinutes": 30,
    "stagingTestConfigs": [
        {
            "useCase": "MOBILE_HOMEPAGE",
```

-continued

```
            "model": "mobileserver:mobile_federator",
            "trafficPercentage": 100
        }
    ]
}
```

The example configuration above includes an owner with a Uniform Resource Name (URN) of "jsmith" and a duration of 30 minutes. The configuration also includes a set of "stagingTestConfigs" that specify a use case of "MOBILE_HOMEPAGE," which indicates that the access point for the content feed is the home page of a mobile application or web page on a mobile device. The "stagingTestConfigs" additionally include a model name of "mobileserver:mobile_federator" for a machine learning model and specifies replication of 100% of live traffic to the machine learning model.

Another example representation of a configuration for a staging test includes the following:

```
{
    "owner": "urn:jsmith"
    "durationInMinutes": 30,
    "stagingTestConfigs": [
        {
            "useCase": "MOBILE_HOMEPAGE",
            "model": "mobileserver:mobile_federator_ramp",
            "trafficPercentage": 50
        },
        {
            "useCase": "MOBILE_HOMEPAGE",
            "model": "mobileserver:mobile_federator_control",
            "trafficPercentage": 50
        }
    ]
}
```

The example configuration above includes an owner with a Uniform Resource Name (URN) of "jsmith" and a duration of 30 minutes. The configuration also includes two sets of "stagingTestConfigs" for two different models. Both sets of "stagingTestConfigs" have the same use case of "MOBILE_HOMEPAGE" and specify replication 50% of live traffic to direct to the corresponding machine learning model. One model has a model name of "mobileserver: mobile_federator_ramp," and the other model has a model name of "mobileserver:mobile_federator_control." As a result, the configuration is used to specify a staging test that executes two machine learning models (or two different versions of a machine learning model), each with 50% of live traffic. In turn, the staging test can be used to compare the performances of the machine learning models on a "side by side" basis (e.g., in the same staging host while processing the same stream of live traffic). The configuration optionally specifies the name and/or path of an A/B test that can be used to perform the comparison.

After receiving configurations for the staging tests from data repository 134 and/or another mechanism, staging service controller 202 adds the staging tests to a queue 202. For example, staging service controller 202 assigns a unique identifier (ID) to each staging test and adds IDs for the staging tests to queue 234 in the order in which the configurations for the staging tests were received.

Staging service controller 202 uses queue 234 and a set of hosts states (e.g., host state 1 218, host state y 220) of the staging test hosts to deploy and run the staging tests in staging environment 206. For example, a staging test host has a host state of "available" when the staging test host is not currently running a staging test and is able to start running a new staging test. A staging test host has a host state of "unavailable" when the staging test host is currently running a staging test and thus cannot be used to run another staging test. A staging host has a host state of "down" when the staging test host is experiencing a failure and/or outage that prevents the staging host from running any staging tests.

Staging service controller 202 uses an application programming interface (API) and/or other communication mechanism with the staging test hosts to receive updates to their corresponding host states. For example, staging service controller 202 periodically polls staging test hosts in staging environment 206 for updates to their corresponding host states. Staging service controller 202 also maintains, in data repository 134 and/or an in-memory data store, a mapping of a host name of each staging test host in staging environment 206 to the host state of the staging test host and a timestamp of the most recent update to the host state. When staging service controller 202 requests an update to the host state of a staging host that is not experiencing a failure or outage, the staging host responds with its availability to run a staging test (e.g., currently running a staging test or available to run a staging test). Conversely, a staging host that is experiencing a failure or outage will not respond to a host state update request from staging service controller 202. Thus, when a staging host does not respond within a certain timeframe to one or more of these requests, staging service controller 202 updates the mapping containing the staging host's name to indicate that the staging host is down and cannot be used to run staging tests.

When a staging test host has a host state that indicates availability to run a staging test, staging service controller 202 deploys the staging test at the front of queue 234 on the staging test host. For example, staging service 202 uses an interface with the staging test host to transmit one or more parameters of the staging test (e.g., model name, use case, proportion of live traffic, etc.) to the staging test host. The staging test host uses the parameters to retrieve a representation of the machine learning model, features or feature producers used by the machine learning model, and/or other resources used to run the staging test. The staging test host also sets up transmission of live traffic associated with the use case at the specified percentage from a corresponding dispatcher host (e.g., by communicating the use case, proportion of live traffic, and/or other relevant configuration parameters to the dispatcher host).

Like host states of staging test hosts in staging environment 206, staging service controller 202 tracks the test status (e.g., test status 1 222, test status x 224) of each staging test submitted to the system. Staging service controller 202 also communicates changes to the test status to the owner of the test (e.g., via an API, command line interface, email, alert, etc.). A staging test has a test status of "pending" when the staging test has been received at staging service controller 202 but has not been deployed to a staging test host. A staging test has a test status of "running" when the staging test has been deployed at a staging test host and is running on the staging test host. A staging test has a test status of "complete" after the staging test has run on the staging test host for the specified duration (e.g., as obtained from the configuration for the staging test). A staging test has a test status of "cancelled" when the staging test is cancelled by the owner of the staging test after submitting the staging test to staging service controller 202. A staging test has a test status of "failed" when the staging test is unable to run after a certain number of retries.

Staging service controller 202 maintains, in data repository 134 and/or an in-memory data store, a mapping of an ID for each staging test to the test status of the staging test. Staging service controller 202 also stores, in the mapping and/or one or more records that can be linked to the mapping, additional attributes related to the staging test (e.g., owner, duration, model name, use case, etc.) and/or test status (e.g., last test status update, etc.). After a staging test is deployed at a staging test host, staging service controller 202 changes the test status of the staging test from "pending" to "running" Staging service controller 202 also records the start time of the staging test in the mapping of the staging test's ID to the test status.

During the staging test, staging service controller 202 continues monitoring the host state of the staging test host. While the staging test host communicates a host state that indicates execution of the staging test, staging service controller 202 stores the host state and/or the latest time at which the host state was received in the corresponding mapping in data repository 134 and/or another data store.

If the staging test host experiences a failure or outage after the staging test is deployed (e.g., after an error or issue with the machine learning model or staging test brings down the staging test host), staging service controller 202 retries the staging test on another staging test host and optionally communicates the retry attempt to the owner of the staging test. Staging service controller 202 also tracks the number of retries of the staging test in the mapping of the staging test's ID to the test status of the staging test and/or an associated record. Once the number of retries reaches a threshold amount, staging service controller 202 changes the test status of the staging test to "failed," discontinues deployment of the staging test, and communicates the failure to the owner of the staging test.

During a running staging test, the machine learning workflow or model in the staging test processes live traffic received from a corresponding dispatcher host in production environment 208. As mentioned above, such processing includes inference, prediction, and/or other types of analysis based on data in the live traffic and/or features generated based on the live traffic. As a result, the staging test measures the ability of the workflow or model to handle real-world data and conditions without deploying the workflow or model in a real-world setting (e.g., production environment 208).

After the staging test has run for the specified duration (e.g., based on the start time of the staging test recorded by staging service controller 202), staging service controller 202 uses the interface with the staging test host to stop the staging test. Staging service controller 202 also updates the staging test's test status to "complete" and optionally records the completion time of the staging test in the mapping of the staging test's ID to the test status.

In one or more embodiments, the system of FIG. 2 includes functionality to handle shifts in live traffic across data centers, collocation centers, and/or other locations associated with production environment 208. In these embodiments, live traffic is shifted from a first location (e.g., cluster, data center, etc.) in production environment 208 to a second location in production environment 208 for load testing, load balancing, and/or failover purposes. After the live traffic shift is performed, a staging test host that is deployed in staging environment 206 in the first location is unable to receive the live traffic from a corresponding dispatcher host in production environment 208 in the first location.

To allow the staging test host to receive live traffic from production environment 208 independently of the location of the live traffic, the system of FIG. 2 configures production environment 208 so that each location of production environment 208 includes at least one dispatcher host that can replicate live traffic to the staging test host. For example, the staging test host begins receiving live traffic from a dispatcher host in the same location at the start of a staging test. During the staging test, live traffic used in the staging test is shifted to a new location in production environment 208. Instead of stopping or pausing the staging test, a dispatcher host in the new location begins replicating the live traffic to the staging test host, which allows the staging test host to continue the executing staging test using the live traffic received from the new location.

The system of FIG. 2 also, or instead, manages the shift in live traffic by moving the staging test to the same location as the shifted traffic. Continuing with the above example, staging service controller 202 stops the staging test at the staging test host in the first location (e.g., by issuing a command to stop the staging test to the staging test host) and deploys the staging test on a different staging test host in the second location. As a result, the staging test runs in the new location to which the live traffic has shifted instead of the old location, which may be experiencing issues or outages in services or components that are used by the staging test and/or that affect the performance or execution of the staging test.

In one or more embodiments, each staging test host generates and/or collects metrics (e.g., metrics 236-238) that represent the system impact of a machine learning model in a staging test during execution of the staging test on the staging test host. For example, the metrics include latencies, queries per second (QPS), error rates, processor utilization, memory usage, garbage collection duration, heap utilization, and/or timeout counts. The metrics are collected for the machine learning model in the staging test, downstream services used by the machine learning model, other components involved in the execution of the machine learning model, and/or an end-to-end workflow involving the machine learning model. At the end of the staging test, the staging test host stores the metrics in data repository 134 and/or another data store. The staging test host also, or instead, transmits the metrics to a management apparatus 204.

The staging test host, management apparatus 204, and/or another component additionally calculate one or more statistics from the metrics. For example, the component aggregates values of the same type of metric (e.g., latency, QPS, error rate, etc.) for the same set of components (e.g., machine learning model, downstream service, end-to-end workflow, etc.) into one or more percentiles (e.g., $50^{th}$ percentile, $99^{th}$ percentile, etc.), a minimum value, a maximum value, a variance, a standard deviation, a skewness, a kurtosis, and/or another summary statistic.

Finally, management apparatus 204 outputs the metrics and/or percentiles associated with each staging test in a report (e.g., reports 244) for the staging test. For example, management apparatus 204 includes lists, charts, graphs, tables, and/or other representations of the metrics and/or percentiles in the report. Management apparatus 204, staging service controller 202, and/or another component also communicate the completion of the staging test to the owner of the staging test (e.g., email, alert, notification, etc.). The component also includes some or all of the metrics and/or a link to and/or copy of the report in the communication. In turn, the owner of the staging test is able to use the report to assess the system impact of the model and/or workflow in the staging test and/or verify that the model and/or workflow can run safely and/or correctly in a production environment.

By running staging tests that direct live traffic from a production environment to machine learning models or workflows in a staging environment, the disclosed embodiments allow creators and/or developers of the machine learning models to determine the correctness and/or system impact of the models or workflows without deploying the models or workflows in the production environment. As a result, the disclosed embodiments improve the performance and/or uptime of the production environment over conventional techniques that deploy new machine learning workflows into production environments and measure the performance or system impact of the new machine learning workflows in the production environments. The creators and/or developers are also able to quickly create configurations that define and/or create the staging tests and use the configurations to run the staging tests. In other words, the disclosed embodiments provide a "self-serve" testing framework that allows the creators and/or developers to measure system impact of machine learning workflows, which improves scalability and reduces computational overhead and processing time over conventional techniques that require manual deployment of workflows into staging and/or testing environments and/or hard coding of staging tests of the workflows. Consequently, the disclosed embodiments improve computer systems, applications, user experiences, tools, and/or technologies related to machine learning, monitoring system impact, and/or testing workflows.

Those skilled in the art will appreciate that the system of FIG. 2 may be implemented in a variety of ways. First, staging service controller 202, the staging test hosts, the dispatcher hosts, management apparatus 204, and/or data repository 134 may be provided by a single physical machine, multiple computer systems, one or more virtual machines, a grid, one or more databases, one or more filesystems, and/or a cloud computing system. Staging service controller 202 and management apparatus 204 may additionally be implemented together and/or separately by one or more hardware and/or software components and/or layers. Instances of service controller 202 and management apparatus 204 may further be scaled with the number of staging test hosts and/or the number of locations associated with staging environment 206 and/or production environment 208.

Second, the system may be used with various types of machine learning models and/or tasks. For example, the system may be used to evaluate the performance and/or correctness of regression models, artificial neural networks, support vector machines, decision trees, random forests, gradient boosted trees, naïve Bayes classifiers, Bayesian networks, clustering techniques, collaborative filtering techniques, deep learning models, hierarchical models, ensemble models, and/or other types of machine learning models. In a second example, the system may be used to verify the availability and/or correctness of features or feature producers used by the machine learning models. In a third example, the system may be used to perform staging tests of other types of data-processing workflows before the workflows are deployed in a production environment.

Figure 3:
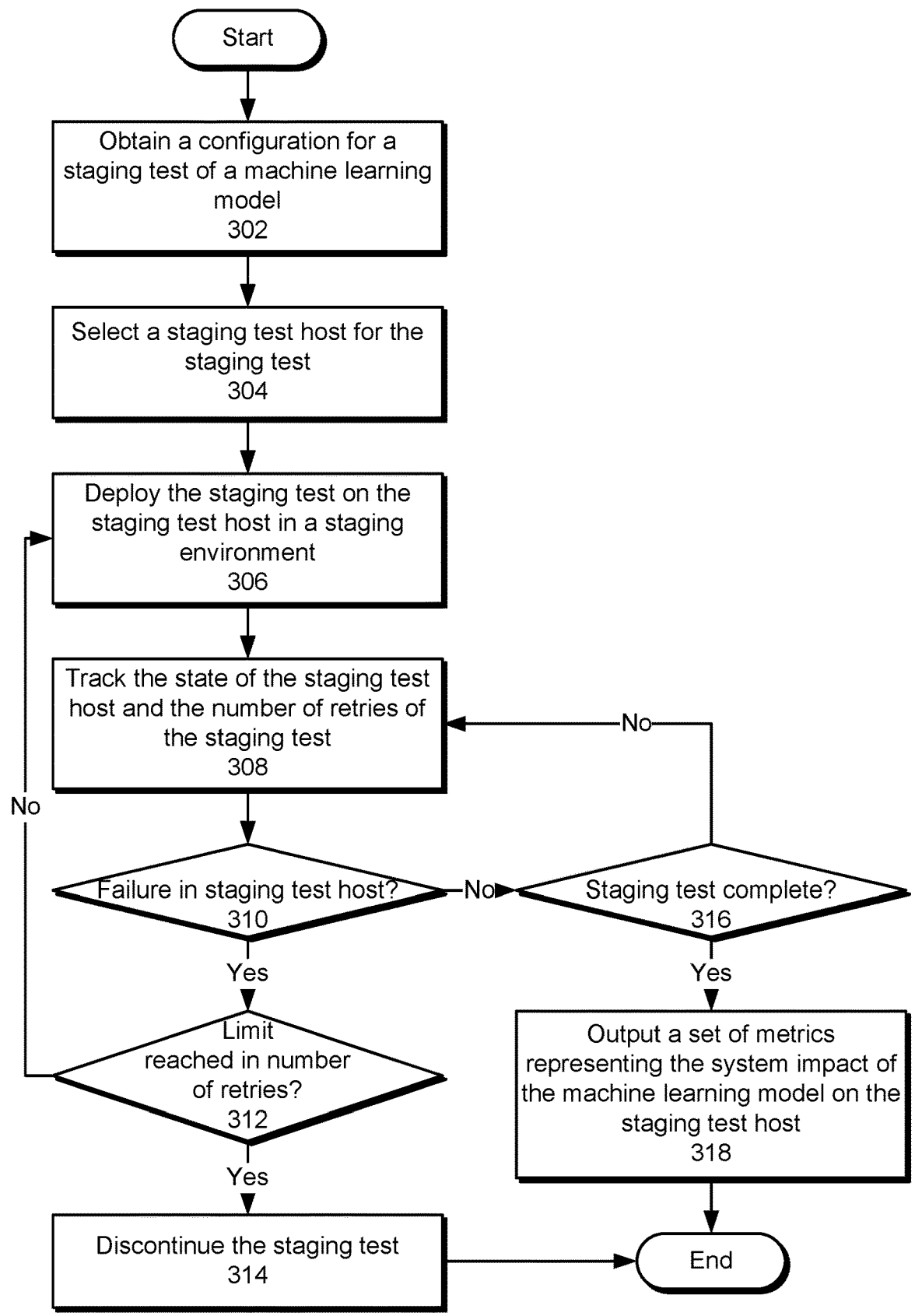
FIG. 3 shows a flowchart illustrating a process of performing a staging test in accordance with the disclosed embodiments.

FIG. 3 shows a flowchart illustrating a process of performing a staging test in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a configuration for a staging test of a machine learning model is obtained (operation 302). The configuration includes model names of one or more machine learning models, a duration of the staging test, a use case associated with the machine learning model(s), a proportion of live traffic to direct to the machine learning model(s), and/or an A/B test that compares the system impact of a given machine learning model with the system impact of another machine learning model. For example, the configuration is used to define a staging test for a machine learning model that scores and/or rank content items in a content feed. As a result, the live traffic includes recent activity and/or users associated with the content items and/or content feed, and the use case includes an access point for the content feed (e.g., device type, platform, application type, channel, etc.).

Next, a staging test host for the staging test is selected (operation 304). For example, the states of a set of staging test hosts in the staging environment are tracked. The state of each staging test host indicates availability to perform testing (e.g., a lack of a currently running test on the staging test host), current execution of a staging test, or unavailability to perform testing (e.g., a failure or outage in the staging test host). The staging test is stored in a queue with other staging tests in the order in which the staging tests were received, and available staging test hosts are selected for the staging tests based on the ordering in the queue. Thus, if the queue is empty and one or more staging test hosts are available to perform testing, the staging test is immediately assigned to an available staging test host. If the queue is not empty when the staging test is received, the staging test is placed into the queue and assigned to an available staging test host after all preceding staging tests have been assigned to available staging hosts.

The staging test is then deployed on the staging test host in a staging environment (operation 306). For example, parameters of the configuration are passed to the staging test host, and the staging test host uses the parameters to retrieve and/or configure a representation of the machine learning model, features or feature producers used by the machine learning model, and/or other resources used to run the staging test. The staging test host also sets up transmission of live traffic associated with the use case at the specified proportion from a corresponding dispatcher host in a production environment (e.g., by communicating the use case and proportion to the dispatcher host).

During execution of the staging test, the machine learning model generates output based on features associated with the live traffic. For example, the features are generated based on user attributes, user activity, and content items in the live traffic, and the machine learning model is applied to the features to generate scores representing predicted likelihoods of interacting with the content items. In turn, the scores can be used to rank the content items and/or output the ranked content items in one or more content feeds.

When the live traffic shifts from a first location (e.g., data center, collocation center, cluster, etc.) associated with the staging test host to a second location that is external to the staging test host, the staging test is moved to another staging test host in the second location. Dispatcher hosts are also, or instead, deployed in every location of the production environment. Thus, a first dispatcher host in a first location of the production environment begins replicating or sending live traffic to the staging test host at the start of the staging test. When the live traffic is shifted from the first location to a second location of the production environment, a second host in the second location begins replicating or sending the live traffic to the staging test without requiring the staging test to be moved to a staging test host in the second location.

While the deployed staging test executes on the staging test host, the state of the staging test host and the number of retries of the staging test are tracked (operation 308) to detect and manage any failures in the staging test host (operation 310). For example, the staging test host is periodically polled for an update to its state. If the staging test host is running the staging test, the staging test host responds with a state indicating that the staging test host is currently executing a staging test. The state of the staging test host and the number of retries of the staging test are continually monitored (operations 308-310) and used to detect and manage failures in the staging test host (operation 310) until the staging test is complete (operation 316).

If the staging host does not respond, a failure in the staging host is detected, and the state of the staging host is changed to indicate an unavailability to perform testing. The failure is then handled based on a comparison of the number of retries of the staging test with a limit to the number of retries (operation 312). If the number of retries has not exceeded a numeric limit (e.g., three retries), the staging test is retried on a different staging test host (operation 306), and the number of retries is incremented. The retried staging test and state of the new staging test host on which the staging test is deployed are also monitored for failures (operations 308-310), and any subsequent failures in the staging test host and/or additional staging test hosts on which the staging test is retried are handled based on the limit to the number of retries (operation 312).

After the number of retries has reached the limit, the staging test is discontinued (operation 314). To allow issues with the staging test to be remedied, the owner of the staging test is notified of the failures and discontinuation of the staging test.

Conversely, if the staging test is able to execute until the staging test is complete (e.g., after the specified duration has passed since the staging test was started), a set of metrics representing the system impact of the machine learning model on the staging test host is outputted (operation 318). For example, lists, tables, visualizations, charts, graphs, and/or other representations of the metrics are outputted in a report, file, notification, alert, email, and/or database record. The metrics include, but are not limited to, a latency, QPS, garbage collection duration, memory usage, processor utilization, garbage collection footprint, error rate, and/or timeout count. The metrics also, or instead, include percentiles or other statistics associated with the latency, QPS, garbage collection duration, memory usage, processor utilization, garbage collection footprint, error rate, and/or timeout count. As a result, the metrics allow the owner of the staging test to assess the performance and/or correctness of the machine learning model and/or perform an A/B test that compares the performance and/or correctness with a baseline or other version of the machine learning model (e.g., another machine learning model executing in the production environment or in the same staging test as the machine learning model).

Figure 4:
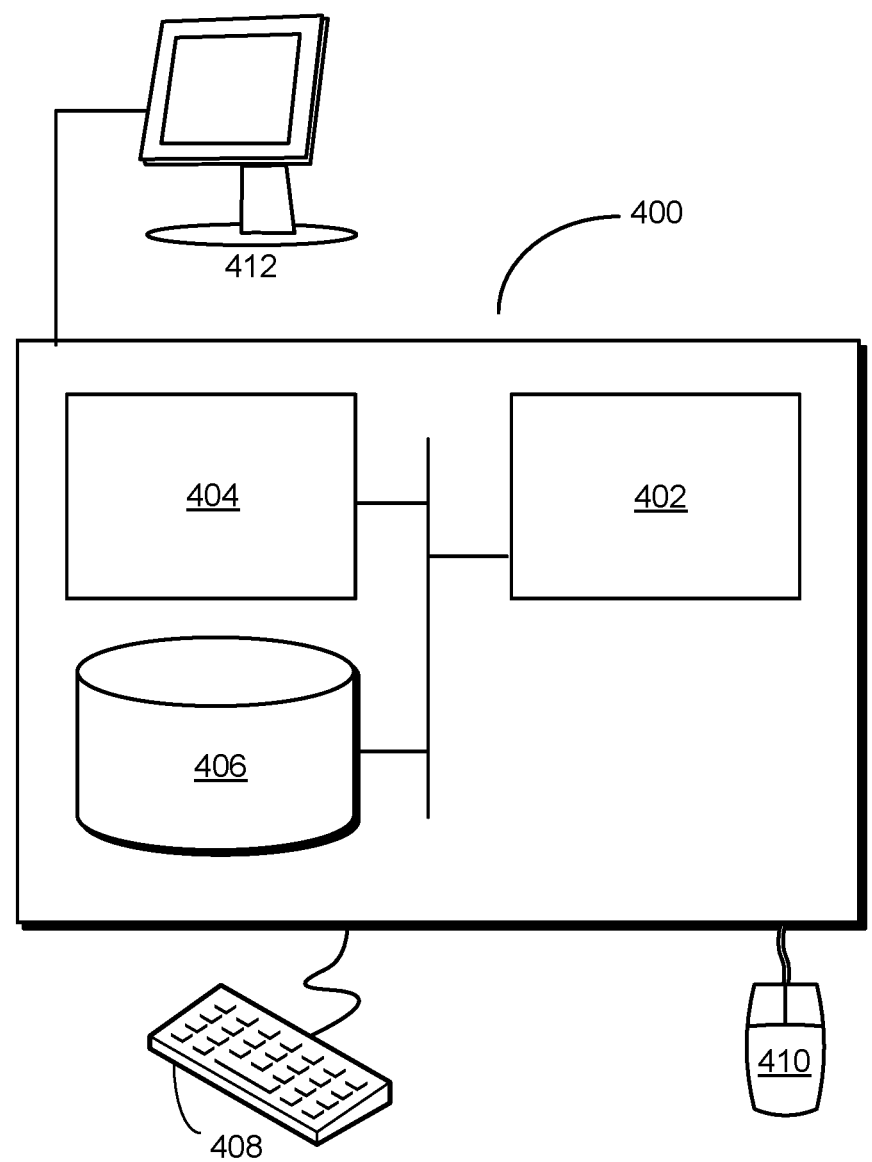
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for implementing a testing framework. The system includes a staging service controller, a set of staging test hosts, and a management apparatus, one or more of which may alternatively be termed or implemented as a module, mechanism, or other type of system component. The staging service controller obtains a configuration for a staging test of a machine learning model. Next, the staging service controller selects, from the set of staging test hosts, a staging test host for the staging test. The system then deploys the staging test on the staging test host in a staging environment, and the staging test host performs the staging test by executing the machine learning model based on live traffic received from a production environment. After the staging test has completed, the management apparatus outputs a set of metrics representing a system impact of the machine learning model on the staging test host.

In addition, one or more components of computer system 400 may be remotely located and connected to the other components over a network. Portions of the present embodiments (e.g., staging service controller, staging test hosts, dispatcher hosts, management apparatus, data repository, online network, etc.) may also be located on different nodes of a distributed system that implements the embodiments. For example, the present embodiments may be implemented using a cloud computing system that configures, runs, and/or monitors staging tests of machine learning models on a set of remote staging test hosts.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    obtaining a configuration for a staging test of a machine learning model, wherein the configuration comprises a model name for the machine learning model, a duration of the staging test, and a use case associated with the machine learning model;
    selecting, by one or more computer systems, a staging test host for the staging test;
    deploying, by the one or more computer systems, the staging test on the staging test host in a staging environment, wherein the deployed staging test executes the machine learning model based on real-time traffic received from a production environment, by:
        generating features based on user attributes, user activity, and content items in the real-time traffic; and
        applying the machine learning model to the features to generate scores representing predicted likelihoods of interacting with the content items; and
    after the staging test has completed, outputting a set of metrics representing a system impact of the machine learning model on the staging test host.

2. The method of claim 1, further comprising:
    upon detecting a failure in the staging test host during execution of the staging test on the staging test host, retrying the staging test on another staging test host in the staging environment.

3. The method of claim 2, further comprising:
    tracking a number of retries of the staging test in the staging environment; and
    discontinuing the staging test after the number of retries reaches a limit.

4. The method of claim 1, wherein selecting the staging test host for the staging test comprises:
    tracking states of a set of staging test hosts in the staging environment; and
    selecting, for the staging test, the staging test host with a state that indicates availability to perform testing.

5. The method of claim 4, wherein the states of the set of staging hosts further indicate at least one of:
    current execution of a test; and
    unavailability to perform testing.

6. The method of claim 1, wherein selecting the staging test host for the staging test comprises:
    storing a set of staging tests comprising the staging test in a queue; and
    selecting staging test hosts for the set of staging tests according to an ordering of the set of staging tests in the queue.

7. The method of claim 1, wherein executing the machine learning model based on real-time traffic received from the production environment comprises:
    upon detecting a shift in the real-time traffic from a first location comprising the staging test host to a second location that is external to the staging test host, moving the staging test to another staging test host in the second location.

8. The method of claim 1, wherein the use case comprises:
    an access point for a content feed comprising a ranking of the content items by the scores.

9. The method of claim 1, wherein executing the machine learning model based on real-time traffic received from the production environment comprises:
    transmitting the real-time traffic from a first host in a first location of the production environment to the staging test host; and
    after the real-time traffic has shifted from the first location to a second location of the production environment, transmitting the real-time traffic from a second host in the second location to the staging test host.

10. The method of claim 1, wherein the configuration further comprises a proportion of the real-time traffic to direct to the machine learning model in the staging environment.

11. The method of claim 1, wherein the configuration further comprises an AB test that compares the system impact of the machine learning model with an additional system impact of an additional machine learning model.

12. The method of claim 1, wherein the set of metrics comprises at least one of:
    a latency;
    a queries per second (QPS);
    a garbage collection duration;
    a memory usage;
    a processor utilization;
    a garbage collection footprint;
    an error rate;
    a timeout count; and
    a percentile.

13. A system, comprising:
    one or more processors; and
    memory storing instructions that, when executed by the one or more processors, cause the system to:
        obtain a configuration for a staging test of a machine learning model, wherein the configuration comprises a model name for the machine learning model, a duration of the staging test, and a use case associated with the machine learning model;
        select a staging test host for the staging test;
        deploy the staging test on the staging test host in a staging environment, wherein the deployed staging test executes the machine learning model based on real-time traffic received from a production environment, by:
            generating features based on user attributes, user activity, and content items in the real-time traffic; and
            applying the machine learning model to the features to generate scores representing predicted likelihoods of interacting with the content items; and
        after the staging test has completed, output a set of metrics representing a system impact of the machine learning model on the staging test host.

14. The system of claim 13, wherein the memory further stores instructions that, when executed by the one or more processors, cause the system to:
    track a number of retries of the staging test in the staging environment;
    upon detecting a failure in the staging test host during execution of the staging test on the staging test host, retry the staging test on another staging test host in the staging environment; and discontinue the staging test after the number of retries reaches a limit.

15. The system of claim 13, wherein selecting the staging test host for the staging test comprises:
tracking states of a set of staging test hosts in the staging environment, wherein the states comprise at least one of availability to perform testing, current execution of a test, and unavailability to perform testing; and
selecting, for the staging test, the staging test host with a state that indicates the availability to perform testing.

16. The system of claim 13, wherein selecting the staging test host for the staging test comprises:
storing a set of staging tests comprising the staging test in a queue; and
selecting staging test hosts for the set of staging tests according to an ordering of the set of staging tests in the queue.

17. The system of claim 13, wherein the configuration further comprises at least one of:
a proportion of the real-time traffic to direct to the machine learning model in the staging environment; and
an AB test that compares the system impact of the machine learning model with an additional system impact of an additional machine learning model.

18. A non-transitory computer-readable storage medium storing instructions that when executed by a computer cause the computer to perform a method, the method comprising:
obtaining a configuration for a staging test of a machine learning model, wherein the configuration comprises a model name for the machine learning model, a duration of the staging test, and a use case associated with the machine learning model;
selecting a staging test host for the staging test;
deploying the staging test on the staging test host in a staging environment, wherein the deployed staging test executes the machine learning model based on real-time traffic received from a production environment, by:
generating features based on user attributes, user activity, and content items in the real-time traffic; and
applying the machine learning model to the features to generate scores representing predicted likelihoods of interacting with the content items; and
after the staging test has completed, outputting a set of metrics representing a system impact of the machine learning model on the staging test host.

* * * * *

UNITED STATES PATENT AND TRADEMARK OFFICE
CERTIFICATE OF CORRECTION

PATENT NO. : 11,392,469 B2
APPLICATION NO. : 16/447739
DATED : July 19, 2022
INVENTOR(S) : Mohamed et al.

It is certified that error appears in the above-identified patent and that said Letters Patent is hereby corrected as shown below:

In the Claims

In Column 16, Line 22, in Claim 11, delete "AB" and insert --A/B-- therefor

In Column 17, Line 22, in Claim 17, delete "AB" and insert --A/B-- therefor

Signed and Sealed this
Twenty-fifth Day of October, 2022

Katherine Kelly Vidal
*Director of the United States Patent and Trademark Office*